United States Patent
Matsushita et al.

(10) Patent No.: US 11,459,039 B2
(45) Date of Patent: Oct. 4, 2022

(54) VEHICULAR UNDER COVER

(71) Applicant: TOYOTA JIDOSHA KABUSHIKI KAISHA, Aichi-ken (JP)

(72) Inventors: Kazuya Matsushita, Toyota (JP); Katsuhisa Hirano, Toyota (JP); Hiromichi Sato, Nagoya (JP); Go Kuroyanagi, Toyota (JP); Yuya Chono, Toyota (JP); Hisashi Jufuku, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 321 days.

(21) Appl. No.: 16/685,004

(22) Filed: Nov. 15, 2019

(65) Prior Publication Data
US 2020/0156565 A1    May 21, 2020

(30) Foreign Application Priority Data

Nov. 19, 2018 (JP) .............................. JP2018-216331

(51) Int. Cl.
*B62D 35/02* (2006.01)
*B62D 25/20* (2006.01)

(52) U.S. Cl.
CPC ......... *B62D 35/02* (2013.01); *B62D 25/2009* (2013.01)

(58) Field of Classification Search
CPC ........ B62D 25/08; B62D 25/14; B62D 25/20; B62D 25/2009; B62D 25/24; B62D 37/02; B62D 35/02; B60K 11/06

USPC ...................................... 180/68.1; 296/180.1
See application file for complete search history.

(56) References Cited

U.S. PATENT DOCUMENTS

| | | | |
|---|---|---|---|
| 5,513,893 A | 5/1996 | Nakata et al. | |
| 8,814,251 B2 * | 8/2014 | Matsuyama | B62D 25/20 |
| | | | 296/180.1 |
| 9,227,677 B2 * | 1/2016 | Hillstroem | B62D 35/02 |
| 2016/0361991 A1 * | 12/2016 | Phan | B60K 11/085 |
| 2017/0174272 A1 * | 6/2017 | Yonezawa | B62D 27/065 |

FOREIGN PATENT DOCUMENTS

| | | | | |
|---|---|---|---|---|
| DE | 4429924 A1 * | 3/1995 | | B62D 35/02 |
| DE | 102013108703 A1 * | 2/2015 | | B62D 35/02 |
| FR | 2895324 A1 | 6/2007 | | |
| FR | 2975659 A1 * | 11/2012 | | B62D 25/2072 |
| JP | S5745454 U | 3/1982 | | |
| JP | H752836 A | 2/1995 | | |
| JP | H7-215074 A | 8/1995 | | |
| JP | 2016-137824 A | 8/2016 | | |
| WO | WO-2013180597 A1 * | 12/2013 | | B60R 13/0861 |

* cited by examiner

*Primary Examiner* — Joseph D. Pape
*Assistant Examiner* — Veronia M Shull
(74) *Attorney, Agent, or Firm* — Hauptman Ham, LLP

(57) ABSTRACT

A vehicular under cover includes an oblong hole-shaped through-hole and is assembled to a lower side of a vehicle so as to cover a lower part of the heat source. In a plan view, the through-hole is formed so that a longitudinal direction of the through-hole is inclined with respect to a front-rear direction of the vehicle. The inclination excludes an orthogonal direction to the front-rear direction of the vehicle.

4 Claims, 9 Drawing Sheets

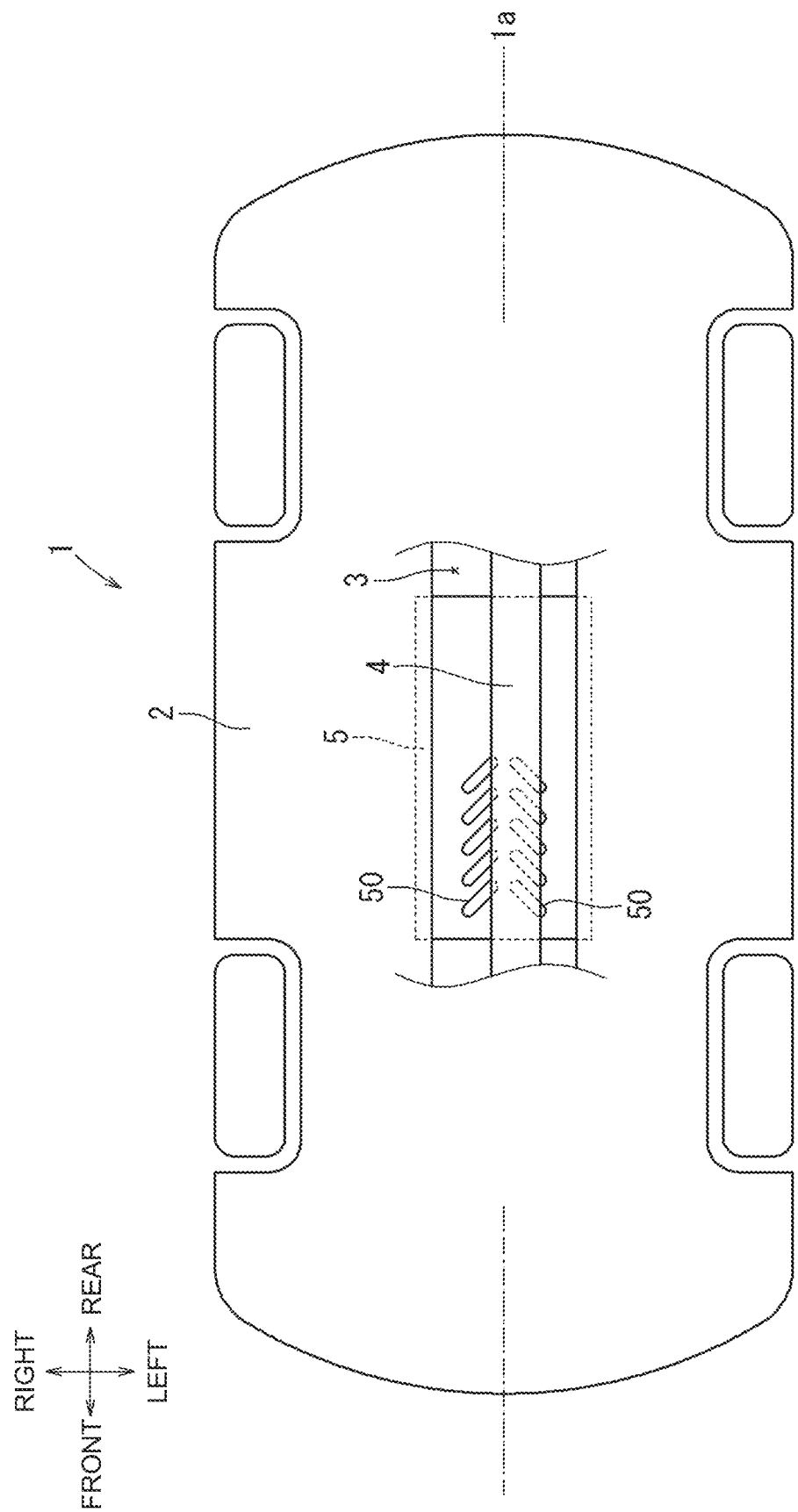

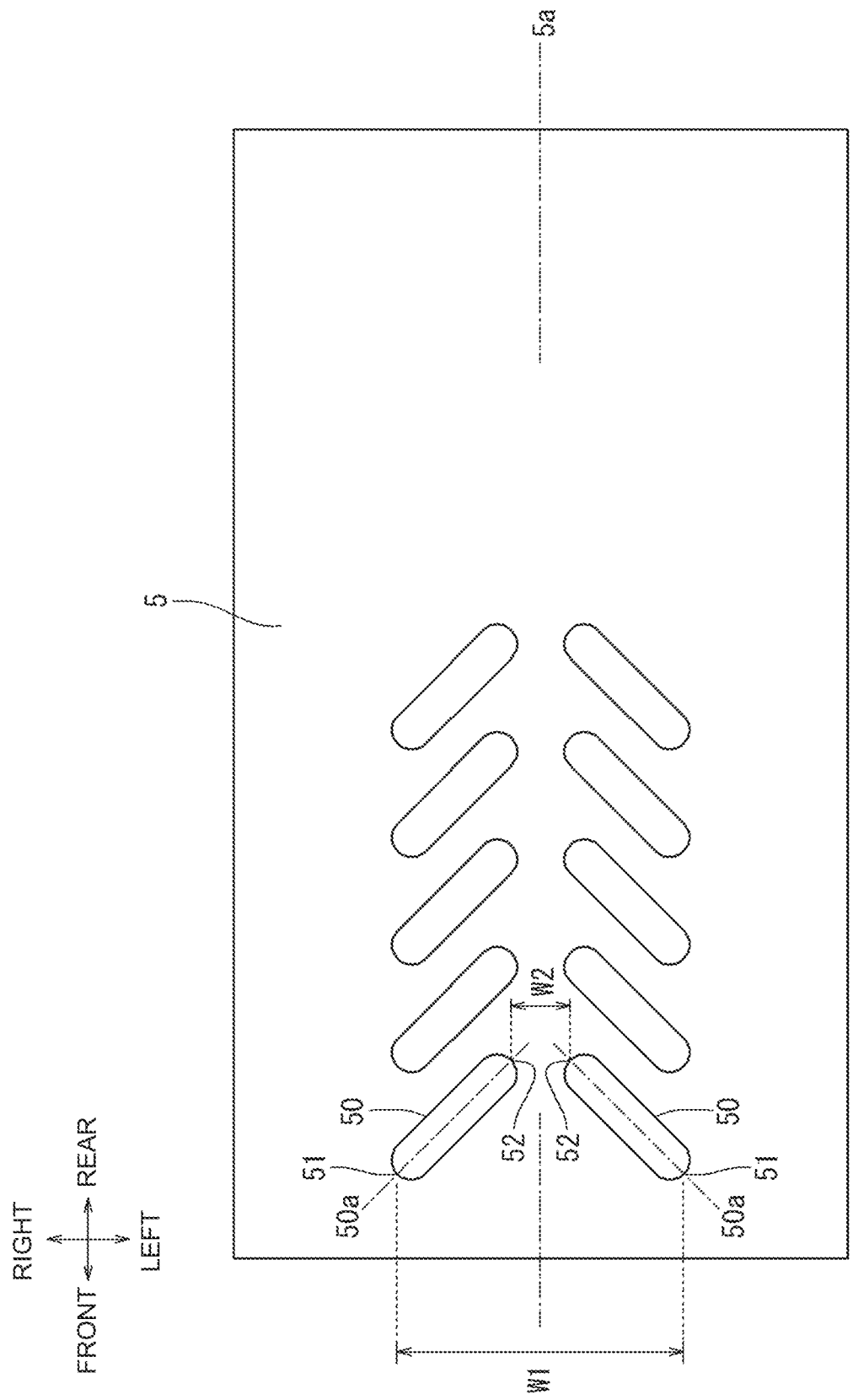

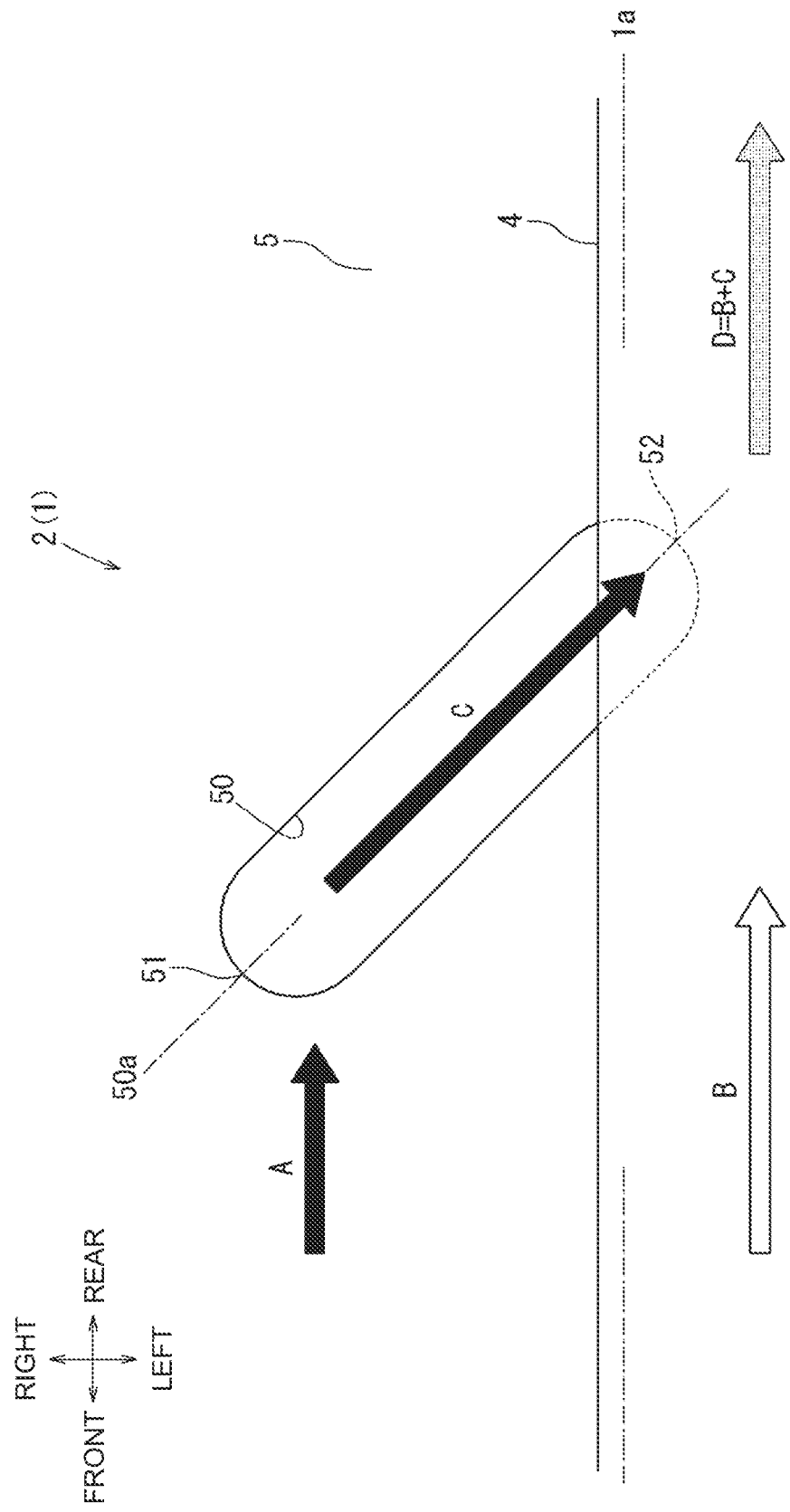

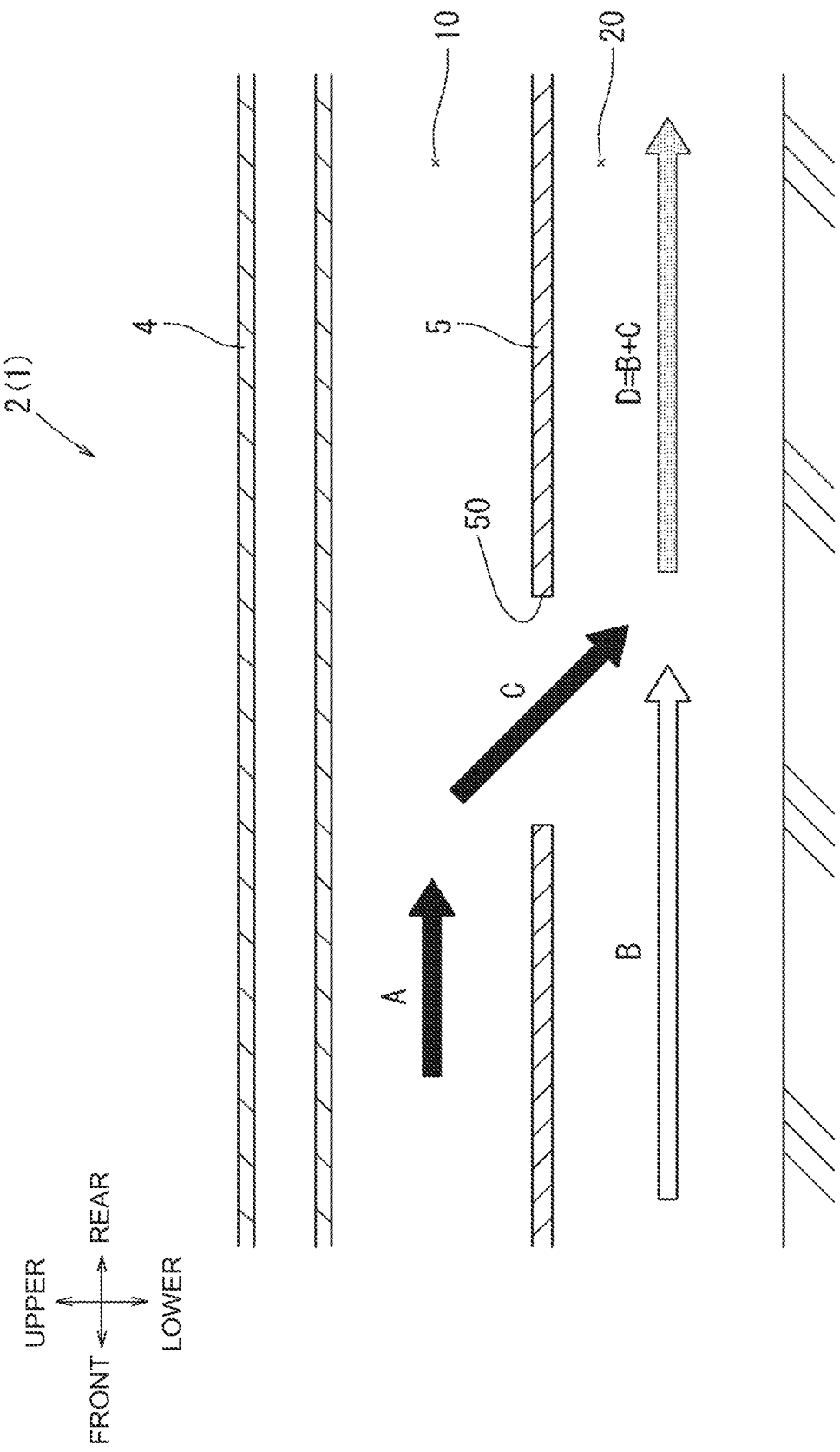

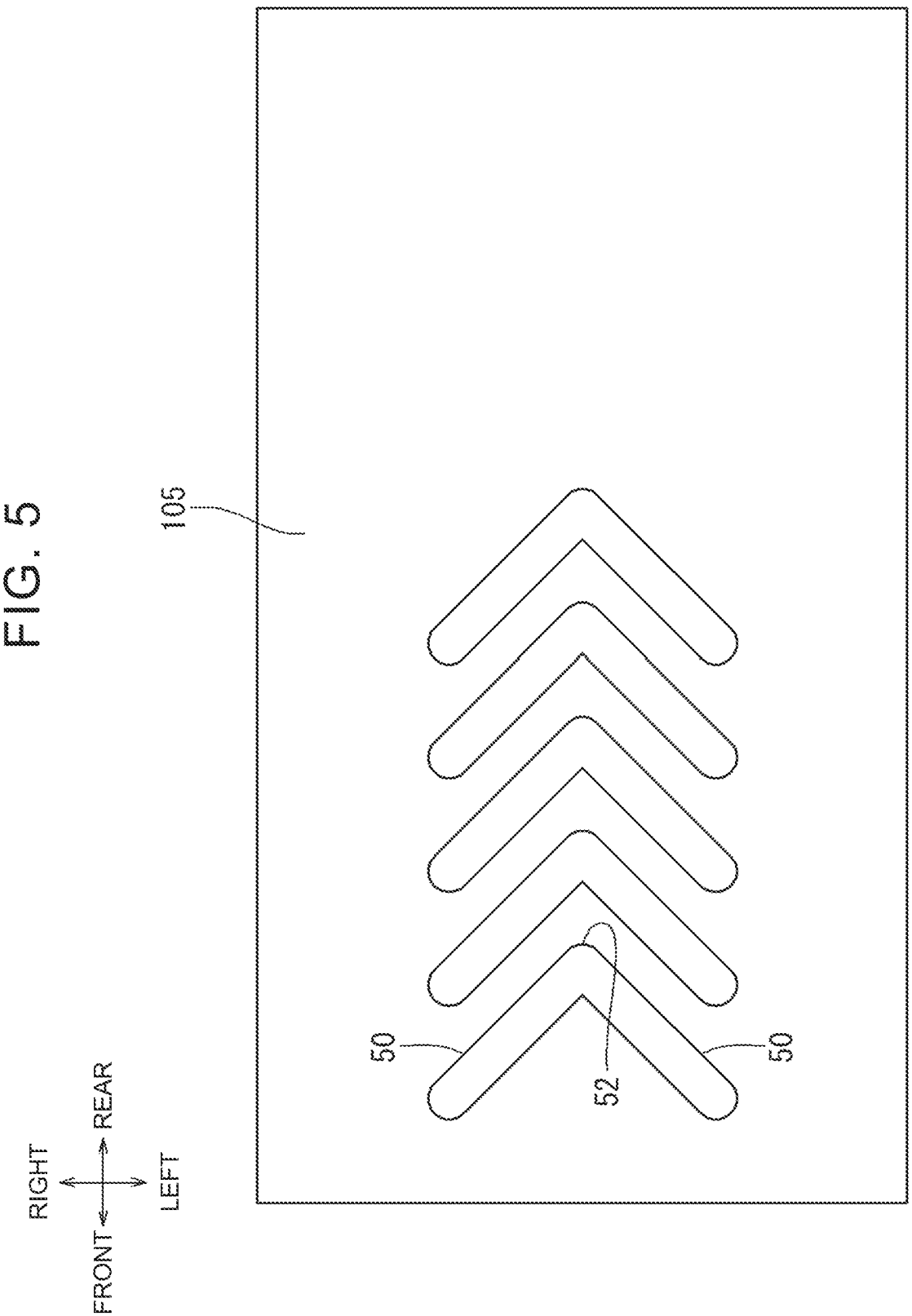

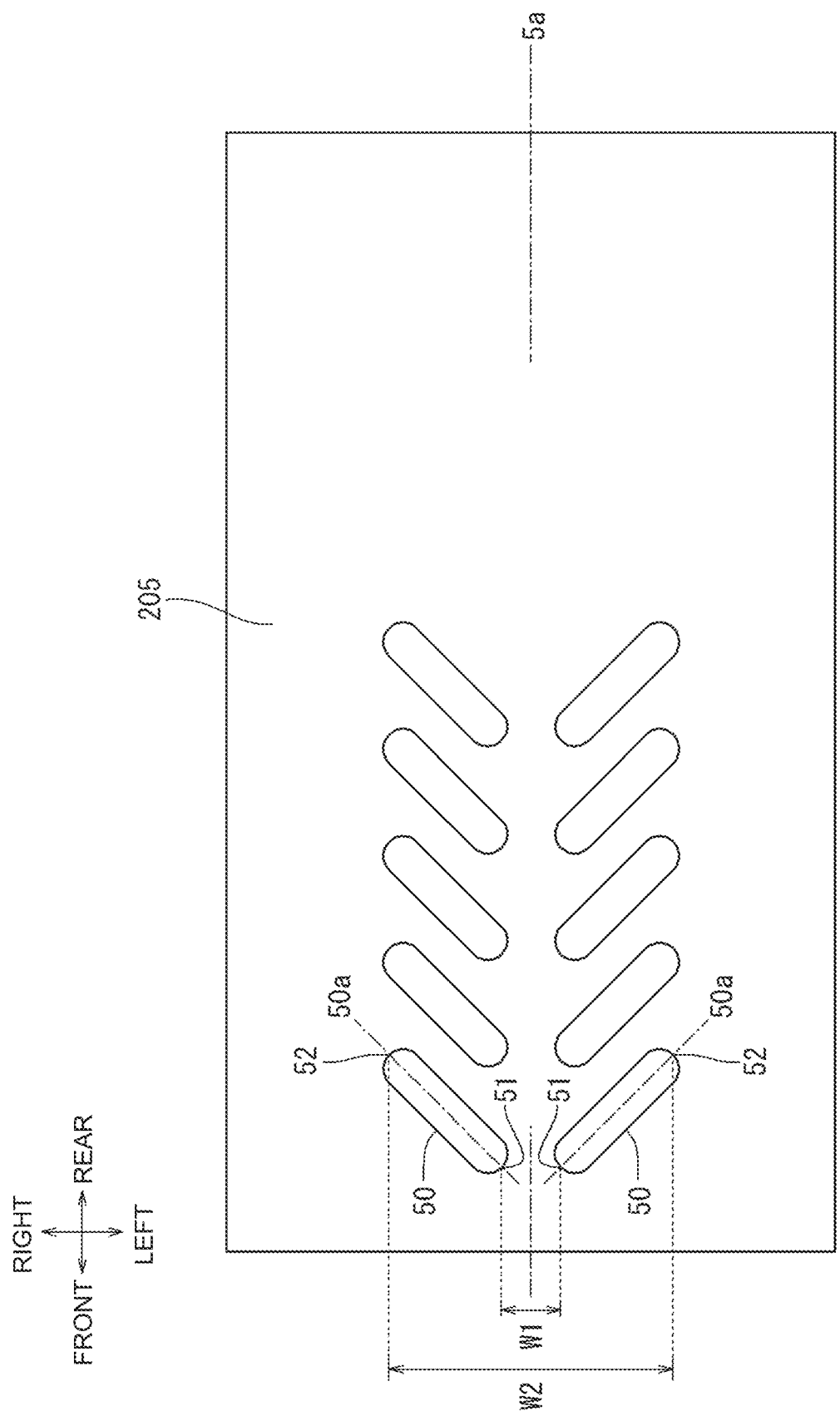

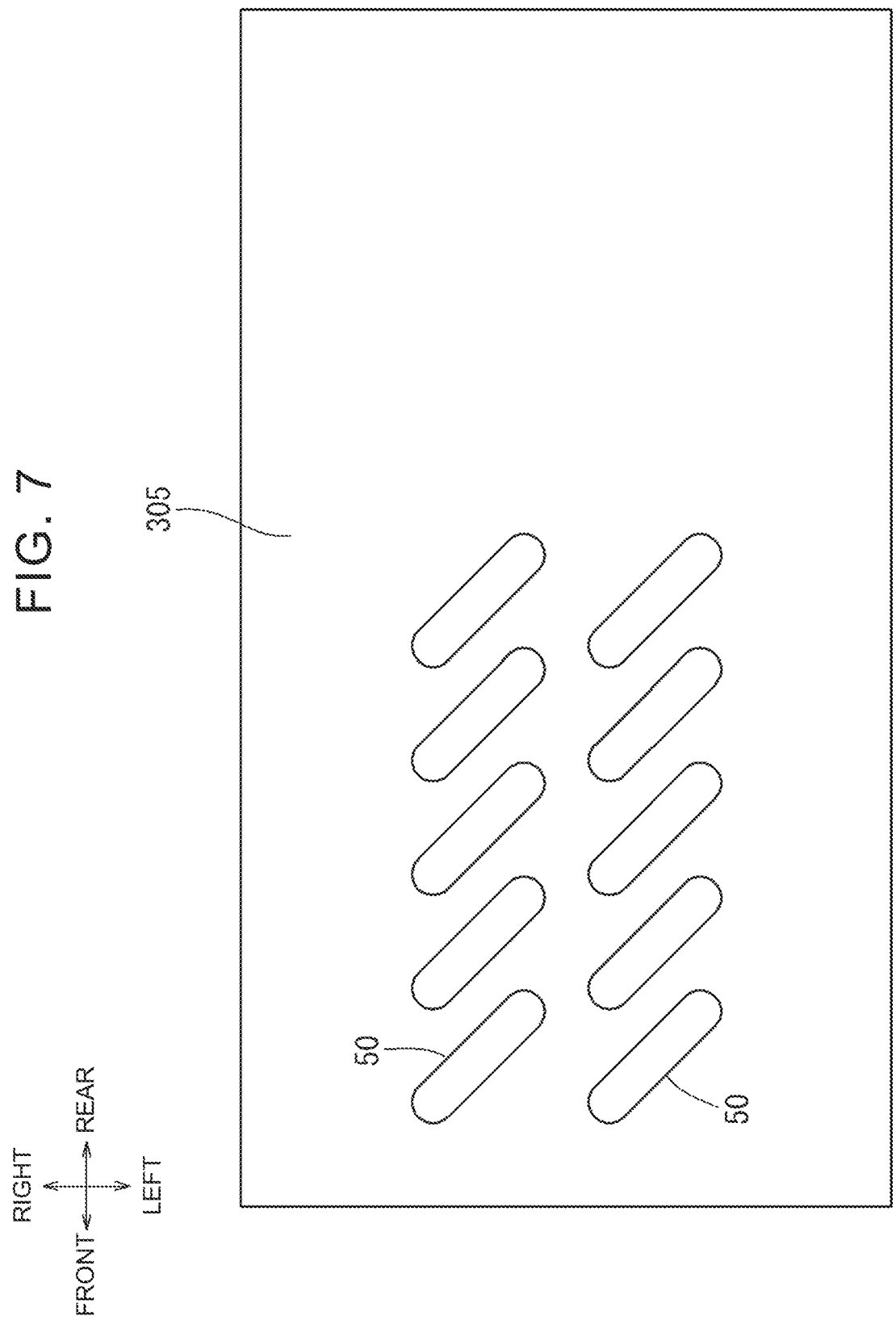

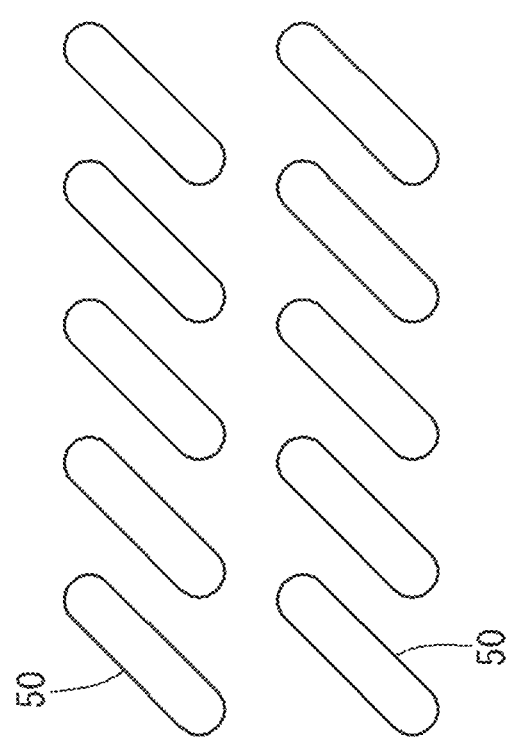

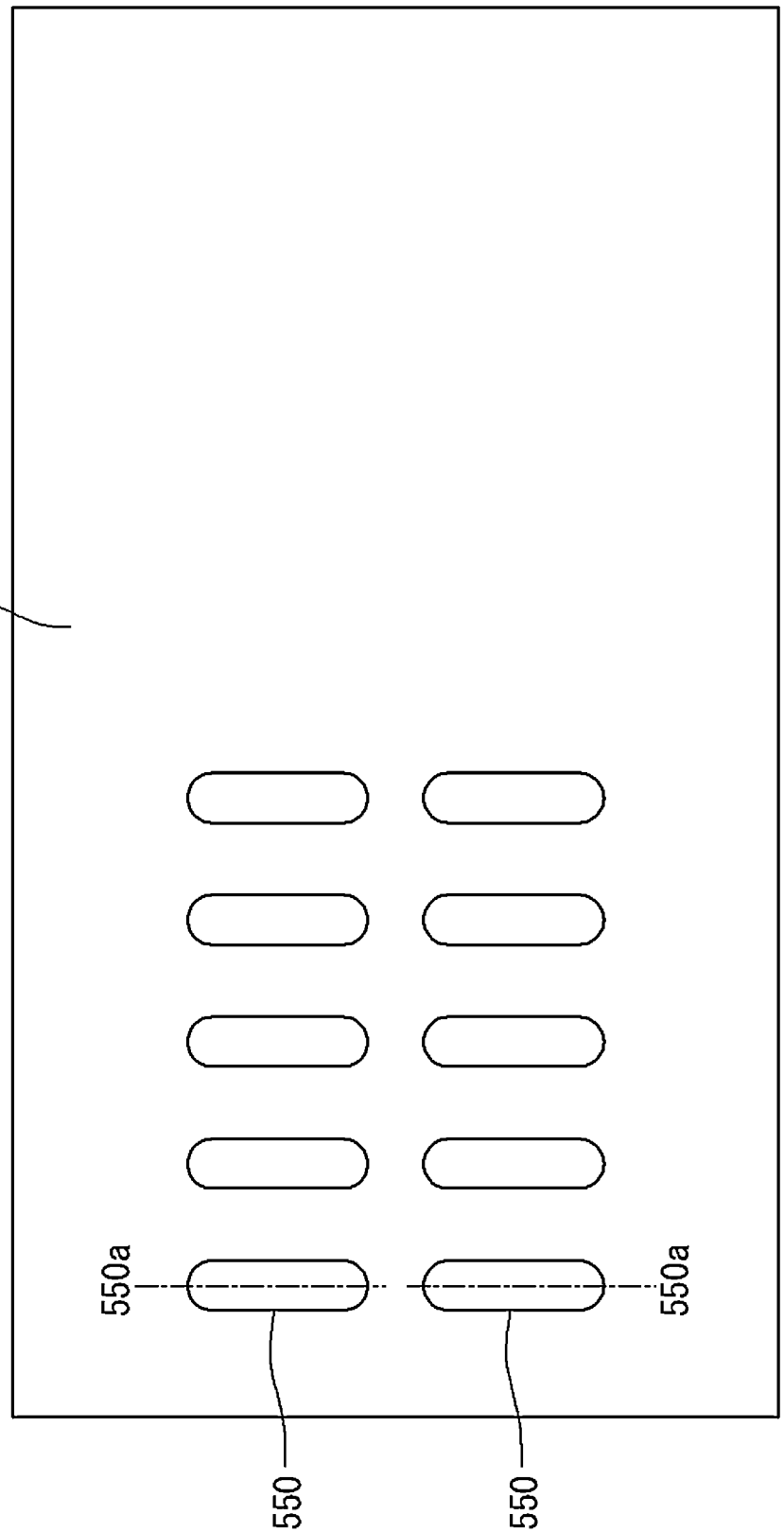

VEHICULAR UNDER COVER

INCORPORATION BY REFERENCE

The disclosure of Japanese Patent Application No. 2018-216331 filed on Nov. 19, 2018 including the specification, drawings and abstract is incorporated herein by reference in its entirety.

BACKGROUND

1. Technical Field

The disclosure relates to a vehicular under cover. Specifically, the disclosure relates to a vehicular under cover that has an oblong hole-shaped through-hole and is assembled to a lower side of a vehicle so as to cover a lower part of a heat source.

2. Description of Related Art

Conventionally, various types of under covers are assembled to a body of an automobile on lower sides of an engine, an exhaust pipe, a fuel tank, and so on so as to cover the engine, the exhaust pipe, the fuel tank, and so on in order to improve an aerodynamic performance while the automobile is traveling. For example, Japanese Unexamined Patent Application Publication No. 7-215074 (JP 7-215074 A) discloses an under cover 505 in which oblong hole-shaped through-holes 550 shown in FIG. 9 are formed. Therefore, it is possible to release heat generated in the engine, the exhaust pipe, and the fuel tank (none of them are shown) to an outside (atmosphere) through the through-holes 550. Thus, it is possible to restrain accumulation of heat caused by the under cover 505. Therefore, it is possible to prevent heat damage of peripheral equipment.

SUMMARY

However, with the technique described in JP 7-215074 A, each of the oblong hole-shaped through-holes 550 is formed so that a longitudinal direction 550a of the through-hole 550 is in an orthogonal direction (a right-left direction) to a front-rear direction of an automobile in a plane view. Therefore, there are instances where a flow of heat released to the outside through the through-holes 550 disturbs a flow of oncoming air under a floor. Therefore, an aerodynamic performance while an automobile is traveling can be deteriorated.

The disclosure has been accomplished to solve this issue and an object of the disclosure is to provide an under cover that is able to prevent heat damage of peripheral equipment and also prevent deterioration of an aerodynamic performance while an automobile is traveling.

The disclosure is configured to achieve the above-mentioned goal, and is configured as described below. The disclosure described in claim 1 is a vehicular under cover that includes an oblong hole-shaped through-hole and is assembled to a lower side of a vehicle so as to cover a lower part of a heat source. In a plane view, the through-hole is formed so that a longitudinal direction of the through-hole is inclined with respect to a front-rear direction of the vehicle. The inclination excludes an orthogonal direction to the front-rear direction of the vehicle.

With this configuration, it is possible to release at least a part of heat generated in the heat source to an outside (atmosphere) through the through-hole. Thus, it is possible to restrain accumulation of heat due to the under cover. Therefore, it is possible to prevent heat damage of peripheral equipment. Further, air sucked out to the outside through the through-hole is able to smoothly join oncoming air under a floor. Therefore, unlike the related art, a flow of heat released to the outside through the through-hole does not disturb a flow of oncoming air under the floor. As a result, it is possible to restrain deterioration of an aerodynamic performance while the vehicle is traveling.

Further, the disclosure described in claim 2 is the vehicular under cover described in claim 1 in which the through-hole may be formed so as to be a pair in a right-left direction of the vehicle. The inclination may be set so that a distance between front sides of the through-holes may be longer than a distance between rear sides of the through-holes.

With this configuration, it is possible to release heat through the right and left through-holes smoothly. Further, sucking out of air through the right and left through-holes is performed smoothly.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic plane view of a lower side of an automobile to which an under cover below an exhaust pipe according to an embodiment of the disclosure is assembled, the lower side of the automobile being seen from above through the automobile;

FIG. 2 is an enlarged view of the under cover below the exhaust pipe shown in FIG. 1;

FIG. 3 is a schematic view describing an action of the under cover below the exhaust pipe shown in FIG. 2;

FIG. 4 is a schematic view of a longitudinal section of FIG. 3;

FIG. 5 is another embodiment (a first modification) of the under cover below the exhaust pipe;

FIG. 6 is another embodiment (a second modification) of the under cover below the exhaust pipe;

FIG. 7 is another embodiment (a third modification) of the under cover below the exhaust pipe;

FIG. 8 is another embodiment (a fourth modification) of the under cover below the exhaust pipe; and FIG. 9 is an enlarged view of an under cover below an exhaust pipe according to a related art.

DETAILED DESCRIPTION OF EMBODIMENTS

Hereinafter, an embodiment of the disclosure is described with reference to FIG. 1 to FIG. 4. In the description below, an "exhaust pipe 4", an "automobile 1", and an "under cover 5 below the exhaust pipe" are described as examples of as a "heat source", a "vehicle", and a "vehicular under cover", respectively. Further, in the description below, upper, lower, front, rear, right, and left directions represent upper, lower, front, rear, right, and left directions described in the drawings. This means that they indicate upper, lower, front, rear, right, and left directions based on a direction of the automobile 1.

First of all, with reference to FIG. 1 and FIG. 2, a body 2 of the automobile 1 and the under cover 5 below the exhaust pipe according to the embodiment are described individually. First of all, the body 2 of the automobile 1 is described (see FIG. 1). In an almost center of the body 2 in a right-left direction, a depressed portion 3 is formed along a front-rear direction 1a as a depression towards a cabin. In the depressed portion 3, the exhaust pipe 4 that connects an engine and a muffler (both of them are not shown) is provided. The body 2 of the automobile 1 is configured as described above.

Next, the under cover 5 below the exhaust pipe is described (see FIG. 2). The under cover 5 below the exhaust pipe is made of a rectangular resin panel member that is able to cover the depressed portion 3 (a lower part of the exhaust pipe 4) of the body 2 described above. Five pairs of oblong hole-shaped through-holes 50 are formed in the under cover 5 below the exhaust pipe along a longitudinal direction 5a of the under cover 5 below the exhaust pipe. Each of the pairs is made in a short direction (a right-left direction) of the under cover 5 below the exhaust pipe. In plane view, the right and left through-holes 50 are formed so that a longitudinal direction 50a of each of the through-holes 50 is inclined with respect to a front-rear direction 1a of the automobile 1 (the longitudinal direction 5a of the under cover 5 below the exhaust pipe) to which the under cover 5 below the exhaust pipe is assembled. The inclination of the longitudinal direction 50a of each of the through-holes 50 excludes an orthogonal direction (the right-left direction) to the front-rear direction 1a.

Further, this inclination is set so that a first distance W1 between front ends 51 of the right and left through-holes 50 becomes longer than a second distance W2 between rear ends 52 of the right and left through-holes 50 (W1>W2). Therefore, this inclination is set to, for example, a range of 1° to 89°, and in this example, the inclination is set to 45°. The under cover 5 below the exhaust pipe is configured as described above. The under cover 5 below the exhaust pipe configured as above is assembled to the lower side of the body 2 of the automobile 1 through known clips and so on so that the under cover 5 below the exhaust pipe covers the above-mentioned depressed portion 3 of the body 2 (see FIG. 1).

Described next with reference to FIG. 3 and FIG. 4 is actions of the under cover 5 below the exhaust pipe assembled to the body 2 of the automobile 1 as described above. When the automobile 1 travels, hot air (referred to as first air A) warmed up by heat generated in the exhaust pipe 4 due to travel of the automobile 1 flows from a front side to a rear side in an internal space 10 that is an inner side (a side of the exhaust pipe 4) of the under cover 5 below the exhaust pipe.

Simultaneously, as the automobile 1 travels, oncoming air below a floor (referred to as second air B) flows from the front side to the rear side in an external space 20 that is an outer side (an atmosphere side) of the under cover 5 below the exhaust pipe. With regard to both of the air A and the air B, a relation that speed (flow speed) of the first air A<speed (flow speed) of the second air B is established. Therefore, a relation that pressure of the internal space 10 of the under cover 5 below the exhaust pipe>pressure of the external space 20 of the under cover 5 below the exhaust pipe is established.

Because of this, the pressure in the external space 20 of the under cover 5 below the exhaust pipe is lower than the pressure in the internal space 10 of the under cover 5 below the exhaust pipe. This means that a flow of air from the internal space 10 to the external space 20 of the under cover 5 below the exhaust pipe is generated. Therefore, at least a part of the first air A (referred to as third air C) is sucked out to the external space 20 through the through-holes 50 of the under cover 5 below the exhaust pipe. As a result, it is possible to release at least a part of heat generated in the exhaust pipe 4 (heat in the internal space 10) to the external space 20.

Thus, it is possible to restrain accumulation of heat caused by the under cover 5 below the exhaust pipe. Hence, it is possible to prevent heat damage of the peripheral equipment. As evident from FIG. 3 and FIG. 4, the third air C is sucked out to the external space 20 along the longitudinal direction 50a of the through-hole 50. Therefore, in the external space 20, the third air C that has been sucked out becomes fourth air D and is able to join the second air B smoothly. Therefore, unlike the related art, a flow of heat released to the external space 20 through the through-holes 50 does not disturb a flow of the second air B in the external space 20. As a result, it is possible to prevent deterioration of an aerodynamic performance while the automobile 1 is traveling.

The under cover 5 below the exhaust pipe according to the embodiment of the disclosure is configured as described above. With this configuration, the right and left through-holes 50 of the under cover 5 below the exhaust pipe are formed so that, in a plane view, the longitudinal direction 50a of each of the through-holes 50 is inclined at a degree of 45° with respect to the front-rear direction 1a (the longitudinal direction 5a of the under cover 5 below the exhaust pipe) of the automobile 1 to which the under cover 5 below the exhaust pipe is assembled. Therefore, it is possible to release at least a part of heat generated in the exhaust pipe 4 (heat in the internal space 10) to the external space 20 through the right and left through-holes 50. This means that it is possible to restrain accumulation of heat caused by the under cover 5 below the exhaust pipe. Therefore, it is possible to prevent heat damage of the peripheral equipment. Further, the third air C sucked out through the right and left through-holes 50 becomes the fourth air D in the external space 20 and is able to join the second air B smoothly. Therefore, unlike the related art, a flow of heat released to the external space 20 through the right and left through-holes 50 does not disturb a flow of the second air B in the external space 20. As a result, it is possible to prevent deterioration of an aerodynamic performance while the automobile 1 is traveling.

Further, with this configuration, the inclination of the longitudinal direction 50a of each of the right and left through-holes 50 is set so that the first distance W1 between the front ends 51 of the right and left through-holes 50 becomes longer than the second distance W2 between the rear ends 52 of the through-holes 50 (W1>W2). Thus, it is possible to release heat smoothly through the right and left through-holes 50. Further, it is possible to suck out the third air C smoothly through the right and left through-holes 50.

The under cover 5 below the exhaust pipe according to the embodiment of the disclosure is not limited to the embodiment described above, and changes may be made appropriately as described below. In an under cover 105 below an exhaust pipe, the rear ends 52 of the right and left through-holes 50 may be connected with each other so as to form an almost V-shape (see FIG. 5).

Further, in an under cover 205 below an exhaust pipe, the inclination of each of the right and left through-holes 50 may be set so that the first distance W1 between the front ends 51 of the right and left through-holes 50 becomes shorter than the second distance W2 between the rear ends 52 of the right and left through-holes 50 (W1<W2, see FIG. 6). Further, in an under cover 305 below an exhaust pipe, the right and left through-holes 50 may be formed so as to become almost parallel to each other (see FIG. 7).

Further, an under cover 405 below an exhaust pipe, the right and left through-holes 50 may be formed so as to be almost parallel to each other and inclined in a direction opposite to the inclination of the through-holes 50 of the under cover 305 below the exhaust pipe in the right-left direction (see FIG. 8). Further, an "engine, a fuel tank", "a truck, a bus", and an "engine under cover, an under cover below a fuel tank" may serve as the "heat source", the "vehicle" and the "vehicular under cover", respectively. Further, the through-holes 50 may not be in pairs on the right and left, and may be either on the right or the left.

What is claimed is:

1. A vehicular under cover comprising:
   a pair of oblong-shaped through-holes, wherein the vehicular under cover is attached to a lower side of a vehicle so as to cover a lower part of an exhaust pipe of the vehicle, longitudinal direction of each of the through holes is inclined with respect to a front-rear direction of the vehicle in a plane view, and an inclination excludes an orthogonal direction to the front-rear direction of the vehicle, wherein:
   the inclination is set so that a distance between a front side of adjacent through holes of the through holes is greater than a distance between rear sides of the corresponding through holes;
   when the vehicle is running a pressure in an external space of the vehicular under cover below the exhaust pipe is lower than a pressure of an internal space of the vehicular under cover below the exhaust pipe;
   the vehicular under cover is under the exhaust pipe;
   hot air heated by the exhaust pipe is released to an outside of the vehicle.

2. The vehicular under cover according to claim 1, wherein each of the through-holes is formed directly below the exhaust pipe.

3. The vehicular under cover according to claim 1, wherein an upper edge of each of the through-holes is flush with an upper surface of the vehicle under cover.

4. The vehicular under cover according to claim 1, wherein the inclination is 45-degrees.

* * * * *